(12) United States Patent
Moy et al.

(10) Patent No.: US 7,853,537 B2
(45) Date of Patent: Dec. 14, 2010

(54) LETTER FLOW CONTROL

(75) Inventors: Christian Moy, Grossaffoltern (CH);
Peter Stutz, Hinterkappelen (CH); Hans Jaeger, Thunstetten (CH)

(73) Assignee: Neopost Technologies, Bagneux (FR)

( * ) Notice: Subject to any disclaimer, the term of this patent is extended or adjusted under 35 U.S.C. 154(b) by 326 days.

(21) Appl. No.: 11/672,711

(22) Filed: Feb. 8, 2007

(65) Prior Publication Data

US 2007/0244838 A1 Oct. 18, 2007

Related U.S. Application Data

(63) Continuation of application No. 10/081,263, filed on Feb. 21, 2002, now abandoned.

(60) Provisional application No. 60/270,796, filed on Feb. 23, 2001, provisional application No. 60/277,806, filed on Mar. 22, 2001, provisional application No. 60/277,841, filed on Mar. 22, 2001, provisional application No. 60/277,873, filed on Mar. 22, 2001, provisional application No. 60/277,931, filed on Mar. 22, 2001, provisional application No. 60/277,946, filed on Mar. 22, 2001, provisional application No. 60/338,892, filed on Nov. 5, 2001.

(51) Int. Cl.
*G07B 17/02* (2006.01)

(52) U.S. Cl. .................................................. 705/401
(58) Field of Classification Search .................. 705/401
See application file for complete search history.

(56) References Cited

U.S. PATENT DOCUMENTS

| 4,942,535 | A | * | 7/1990 | Francisco | 700/223 |
| 5,518,122 | A | * | 5/1996 | Tilles et al. | 209/539 |
| 6,078,678 | A | * | 6/2000 | Gavrilos | 382/101 |
| 6,135,265 | A | * | 10/2000 | DiSaverio et al. | 198/464.4 |

OTHER PUBLICATIONS

M2 Presswire, "NEOPOST: Neopost Announces New Range of Mid to High End Franking Machines," Coventry, Jul. 17, 1998, p. 1.*

* cited by examiner

*Primary Examiner*—John W Hayes
*Assistant Examiner*—Nathan Erb
(74) *Attorney, Agent, or Firm*—Sughrue Mion, PLLC

(57) ABSTRACT

A modular franking system including at least one module and a module sensor adapted to sense objects fed to the module. The module can include information on the distance between a position of the sensor and at least one edge of the module, and a location of at least one other module. The modular system can also include a communication system adapted to allow the module to sense objects being transported and communicate information concerning events such as velocity and distance to another module.

7 Claims, 7 Drawing Sheets

LETTER FLOW CONTROL

CROSS-REFERENCE TO RELATED APPLICATIONS

This application is a continuation of Application Ser. No. 10/081,263 filed Feb. 21, 2002, now abandoned, which claims the benefit of U.S. Provisional Application No. 60/270,796, filed Feb. 23, 2001, U.S. Provisional Application No. 60/277,806, filed Mar. 22, 2001, U.S. Provisional Application No. 60/277,841, filed Mar. 22, 2001, U.S. Provisional Application No. 60/277,873, filed Mar. 22, 2001, U.S. Provisional Application No. 60/277,931, filed Mar. 22, 2001, U.S. Provisional Application No. 60/277,946, filed Mar. 22, 2001, and U.S. Provisional Application No. 60/338,892, filed Nov. 5, 2001.

BACKGROUND OF THE INVENTION

1. Field of the Invention

This application relates to modular methods, systems or machines, and more particularly, to creating a reliable workpiece processing path through the modular machine. In one embodiment the modules are part of a franking system. The application also includes a communication bus coupled to each envelope actor and sensor within each module by a bus processor chip with memory that identifies the features of each module.

2. Brief Description of Related Developments

Current modular franking machines align processing modules adjacent to one another without locking the modules to one another and, when appropriate care is not taken, these free standing modular machines give rise to envelope miss feeds.

SUMMARY OF THE INVENTION

The present modular system includes a system comprising at least one module and a module sensor to sense objects fed to the module. In one embodiment, the module can also include information on the distance between its sensor and an edge of the module, where another module is located and if applicable, the module may also include any distance between the modules. A communication system senses objects or mailpieces being transported therein and is able to communicate information and the distance to another module. Additionally, in one embodiment the present modular systems can employ a second module mechanically coupled to the module having the sensor for detecting an object or mailpiece, such as an envelope, and memory for storing the distance from a detector to an edge of a module. An alignment plate can mechanically couple two modules. The plate includes two upstream sockets mechanically mated with two downstream feet of the one module and two downstream sockets mechanically mated with two upstream feet of the second module.

The present modular system can further include first and second modules coupled to one another. A communication system employed by the system includes a host node coupled to each bus node at each actor and sensor within one or more bus inside bus segments within each module. The bus segments within one module connect to bus segments in the next downstream module using an outside bus segment coupled to an outside module segment coupled at a first end to an inside bus segment of an upstream module and coupled to a second end of the outside bus segment to a downstream module.

A system computer within one of the modules is coupled to the communication system as the host node. The system or host node computer includes data memory for storing information that uniquely (a) identifies each authorized module within a system, (b) uniquely identifies the modules employed and (c) uniquely identifies the upstream to downstream positions occupied by each module as a condition for gaining access to the system.

The present modular system can further include one module that is coupled to a main external power cord to a public electrical power utility, and a second or additional modules that are connected to a power source by a secondary power cord. The secondary cord is coupled outside from a powered module to an adjacent module thereby permitting each module to be moved from one position to another within the modular system.

The present modular system can be used in a franking machine and can be designed for processing envelopes, empty or filled, into fully or partially finished mailpieces, that is for example, franked letters ready for delivering to the post. For example, processing envelopes can comprise readying the envelope for mailing and may include weighing, stamping and sealing the envelope. The machine has envelope actors and sensors within at least first and second modules for moving envelopes along an envelope processing path through the modules and for sensing the location of an envelope within each module to determine the distance between the sensors and the upstream and downstream ends of the module.

In one embodiment, the modular system disclosed herein can include at least one module having a module sensor to sense objects fed to the module. The module can include information on the distance between its sensor and an edge of the module, where another module is located and if applicable may also include any distance between the modules. The module can also include a communication system wherein the module senses objects being transported therein and is able to communicate information and the distance information to another module.

A modular franking machine for processing fully or partially finished mailpieces is disclosed. The mailpieces can include envelopes. The machine includes first and second envelope actors and sensors within at least first and second modules for moving envelopes along an envelope processing path through the modules and for sensing the location of an envelope within each module and the distance between the sensor and the edges of upstream and downstream modules.

The second module is coupled downstream from the first module within the envelope processing path and can further include a bus processor chip including data memory for storing information within a data table that uniquely identifies each machine module and uniquely identifies only one authorized combination of modules thereby indicating an unauthorized machine.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
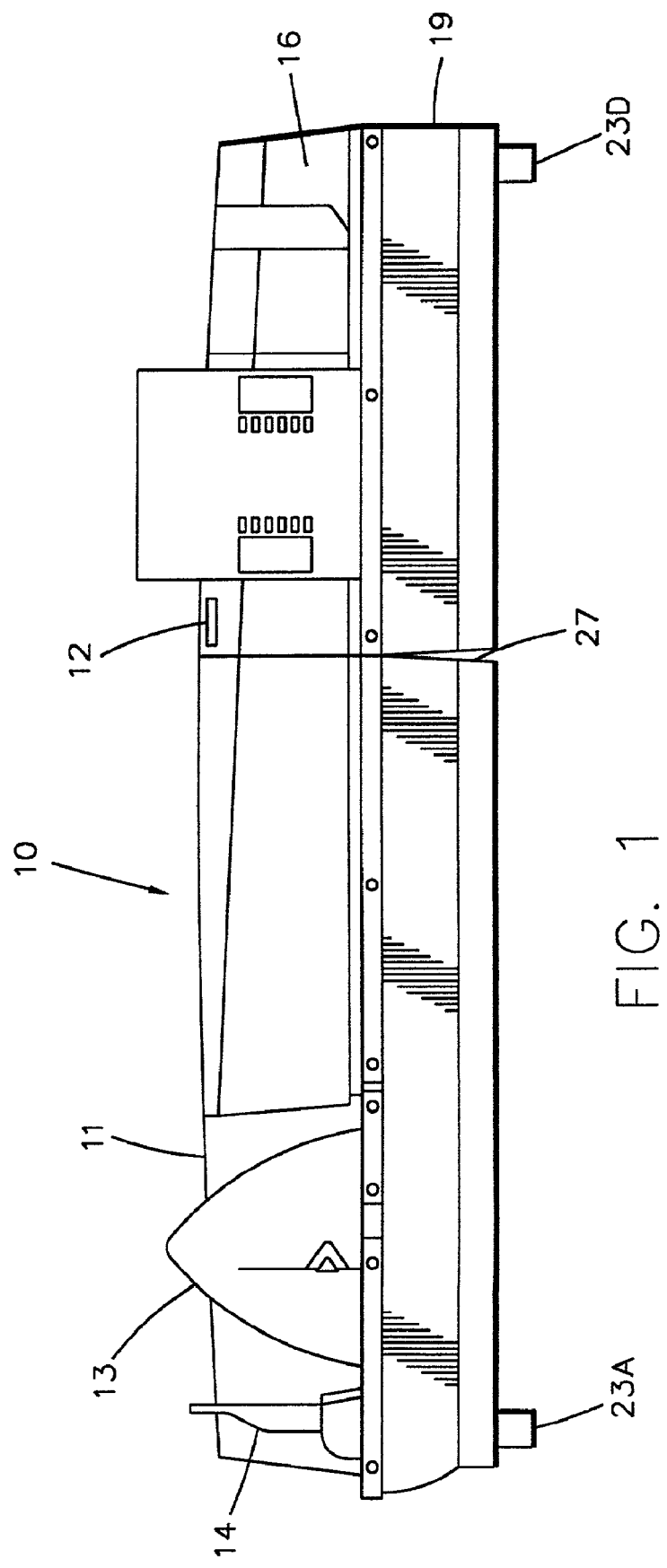
FIGS. 1 and 2 are, respectively, front and back elevation views of a franking machine 10 having an envelope or mailpiece feeder module 11 for feeding envelopes past actors and sensors within the feeder module and into and through a franking module wherein envelopes are processed into mailpieces.

Value metering devices are devices, which in their most basic form meter value. These devices take various forms such as, for example, postage meters (i.e. franking machines), various kinds of vending machines (i.e. lottery vending machines), tax stamp machines, various kinds of ticket dispensing machines, etc. Of these various devices, postage meters are one form of a value metering device that dispense value in the form of postage, e.g. postage indicia, basically either as a stand-alone type postage meter or as part of a mailing system. The stand-alone type postage meter is a postage meter having both its entire accounting system and security system positioned in a single secure housing, the accounting system being mechanically coupled to the printing mechanism which prints the postage related indicia.

In addition to the stand-alone type system as described above there are mailing systems which are formed of a mailing machine (i.e. a machine that can perform different mailing related functions (e.g. feeding, stacking, separating, sealing of envelopes, etc.)) on which a postage meter is securely mounted. The postage meter can be located in a securely sealed housing that contains the accounting and printing mechanisms. These systems can also use a Postal Security Device which is a plug-in type module with its own processing capability that handles postal security relevant operations such as funds handling, logging and generation of indicia data including digital signature.

The mailing machine systems including an electronic postage meter have enabled the users of such equipment to customize the exact type of mailing system they require by designing the overall mailing system in a modular fashion. One is able to set up a mailing system that will include individually removably mounted modules that can be added to or removed from the mailing system. For example, if one had a modular mailing system without an envelope stacker, one could add such a module to their system, and thereby have a mailing system that is able to stack envelopes once the postage has been placed on envelopes that are fed into the system. If the stacker module required repair, the stacker could easily be removed for repair since it is but one module within a modular system. modules or peripherals can be based on features such as inserters, feeders/separators, sealers, scales, moisteners, addressers, stackers, etc. and can be added as appropriate for use with a postage meter to form different types of mailing systems.

It is desirable to have a mailing system that can be securely customized in a fast and reliable manner to control various kinds of external peripherals for handling envelopes. It is desirable to be able to securely customize a mailing system in accordance with customer needs, and to be able to connect various desired mail related peripherals to a mailing system without the need to provide a separate and dedicated electronic port to achieve such a system.

From a manufacturing point of view, there are also several issues to consider. For example, when postage meters are used in a mailing machine, especially a modular mailing machine, there are many different components to be considered based upon customer requirements. Once a mailing machine with a postage meter is manufactured, the machine is not easily expanded. For instance, if a customer orders another component for their mailing machine, in the past it has been generally difficult to easily add the new component to an existing mailing machine. In addition, the devices used in mailing systems are usually specially designed to work with particular postage meters that tend to make them expensive to manufacture. Each device also has to have special programming to be able to electronically communicate with the postage meter, again increasing the cost of each device. In order to differentiate between each device for communication purposes, each device also requires a unique identifier programmed into each device, and the postage meter. This further increases the cost to customize each device.

Various examples of the possible or different kinds of modular mailing systems (machines) for handling the flow of letters or various sizes and thicknesses that can be customized in accordance with the present invention are given below:

| Inserter Connect | Feeder | Sealer | Dynamic | Postage Meter | Address Module | Stacker |
|---|---|---|---|---|---|---|
|  |  |  |  | X |  |  |
|  |  |  | X | X |  |  |
|  | X |  |  | X |  |  |
|  | X |  |  | X |  | X |
|  | X |  | X | X |  | X |
|  | X |  | X | X | X | X |
| X |  |  |  | X |  | X |
|  | X |  |  |  |  | X |

More detailed descriptions of modular franking systems and the communications used between the modules are found in U.S. patent applications Ser. No. 10/081,278, filed on Feb. 21, 2002, and Ser. No. 10/081,276, filed on Feb. 21, 2002, both of which are incorporated by reference in their entirety herein.

Figure 2:
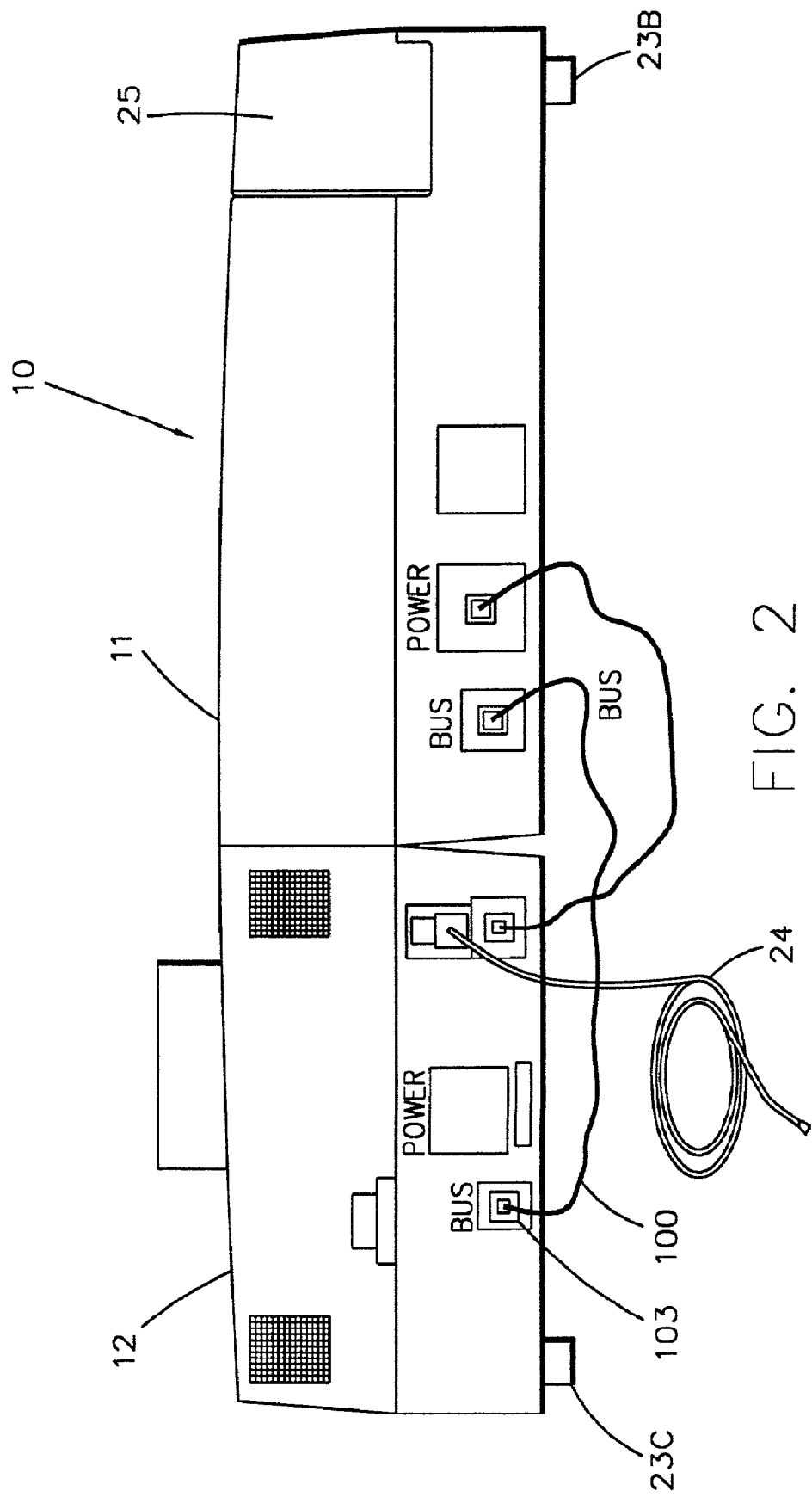

The new and improved modular system, in one embodiment, is shown as a franking machine 10 of FIGS. 1 and 2. The front and rear views respectively of machine 10 include, by way of example, two modules: an envelope feeder module 11 and a PowerPost™ franking module 12 for processing envelopes into mailpieces. Although the present invention is generally described herein as function or processing envelopes, it should be generally understood that any suitable mailpiece article can be used. Additionally, the system can be used in conjunction with or for processing paper like sheets or articles.

Figure 3:
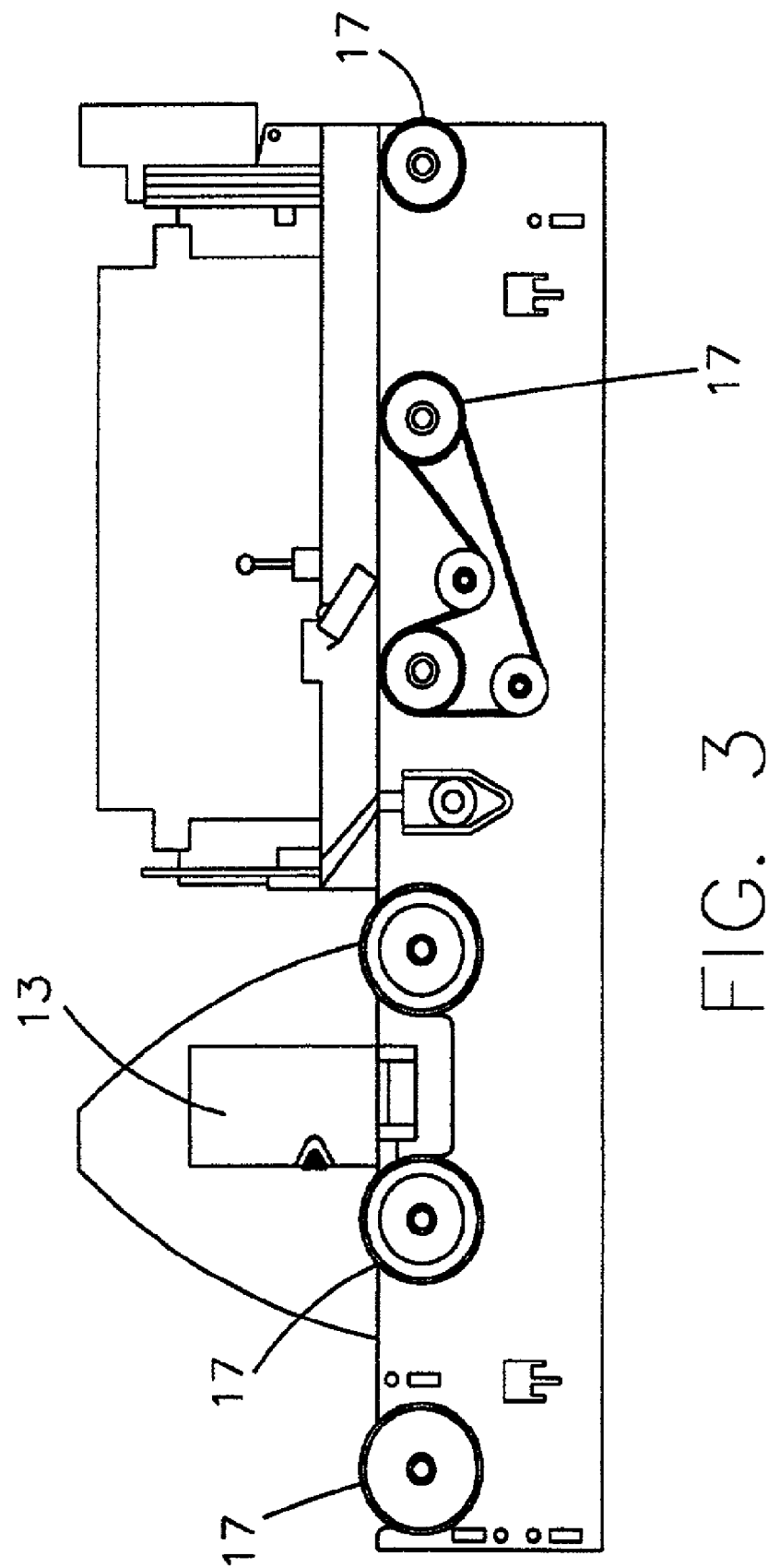
FIG. 3 is a side elevation view of the feeder module 11 with the skins removed to reveal the sets of parallel rollers 17 that feed envelopes or mailpieces through machine 10 into and through module 11.

Feeder module 11 of FIGS. 1 and 2 includes an adjustable envelope side guide wall 13 and a end envelope guide wall 14. The two guide walls support a stack of envelopes laid parallel to floor 15 with the flap of each envelope closed, facing downward in a position to be fed along an envelope processing path defined by floor 15. With reference to FIG. 3, sets of feeder rollers and belts 17 are mounted below the floor 15 in the lower halves 16 of modules 10 and 11. The rollers extend through holes 18 cut into the feed path floor at intervals to permit them to contact and move each envelope along the envelope-processing path 15.

Figure 4:
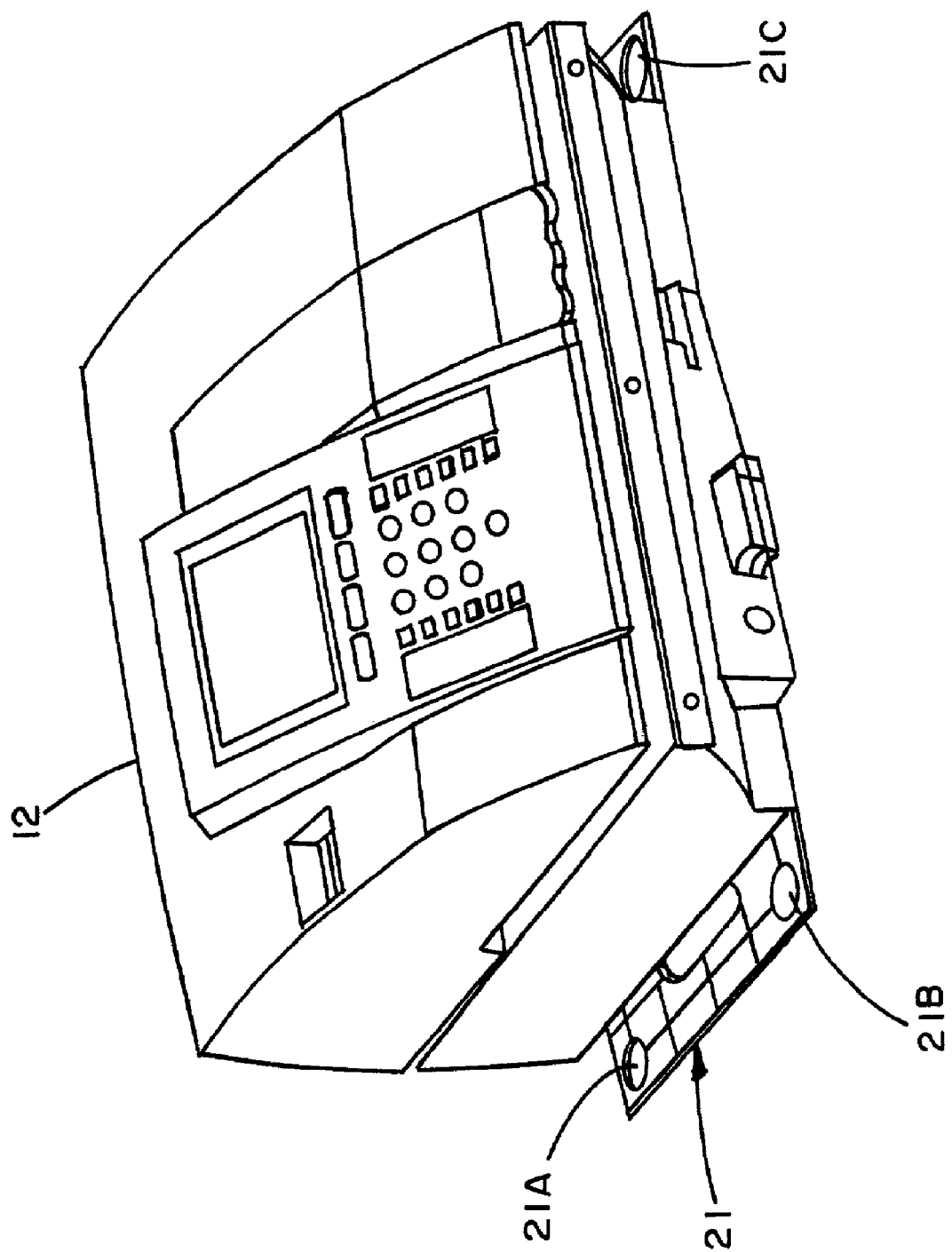
FIG. 4 is a perspective view of the franking module 12 of machine 10 where postage is printed on envelopes or mailpieces also showing one-half of an alignment plate 21 by which modules 11 and 12 are mechanically coupled.
Figure 5:
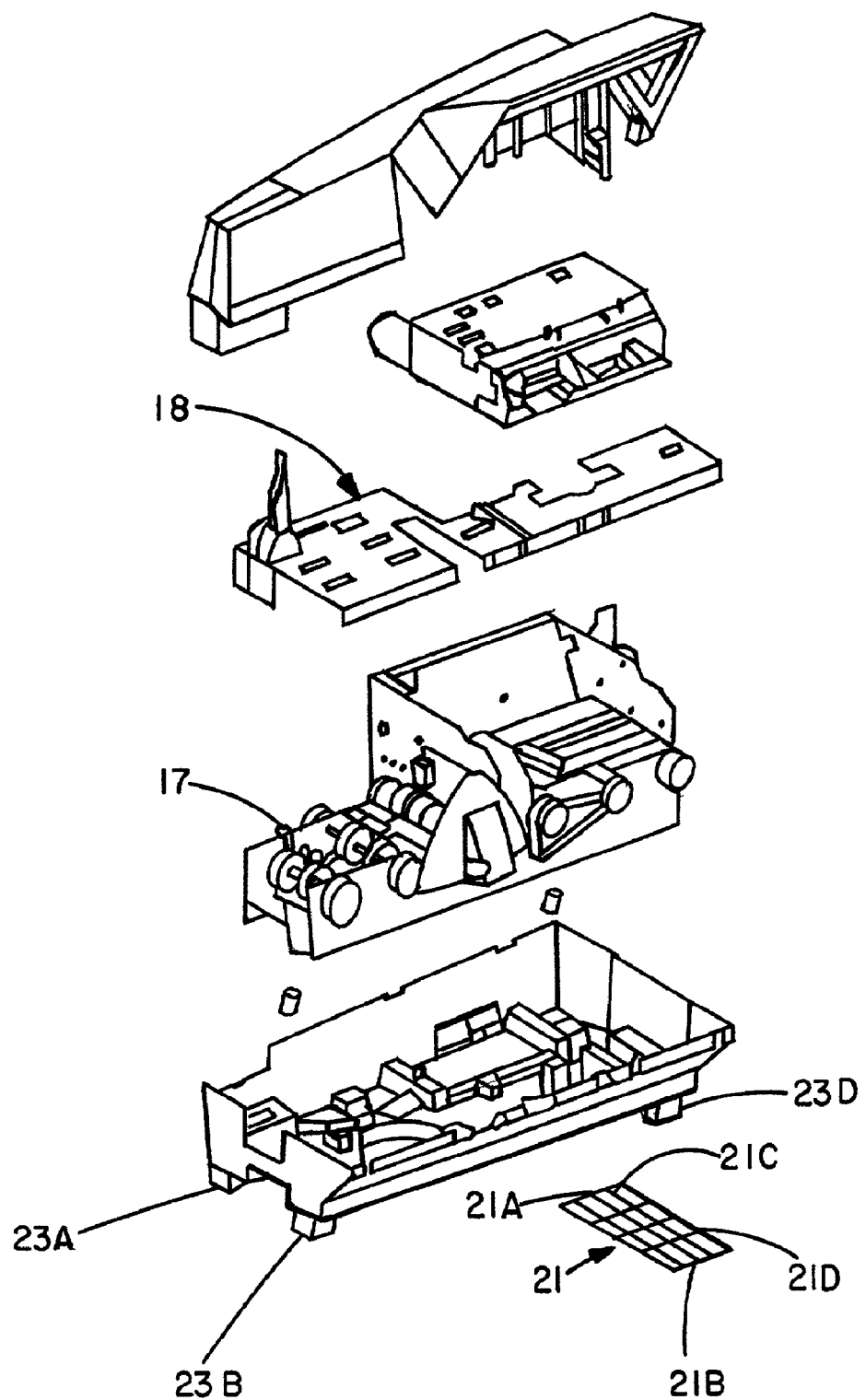
FIG. 5 is an exploded perspective view of the feeder module with the envelope or mailpiece processing path identified by the multiple sets of feeder rollers.

Modules 11 and 12 can be mechanically coupled to one another by a single alignment plate 21 shown in FIGS. 4 and 5. An alignment plate includes circular sockets that mate with the feet at the bottom corners of the modules. In one embodiment, the alignment plate comprises a molded plastic plate. In an alternate embodiment, any suitable material can be used to form the plate.

The alignment plates generally prevent movement between modules 11 and 12 to avoid skewing of envelopes and/or jamming of the envelopes at interfaces between two franking machine modules during envelope feeding operations. Envelope feeding rates can be in the range of 13000 envelopes per hour.

An alignment plate 21 is coupled to the two open ends of the modules 11 and 12 of franking machine 10. For example, the feet at the right end of module 11 are mated with pockets 21A and 21B, for example, of alignment plate 21 and the other end of the plate is positioned under module 12. Likewise, the feet at the left end of module 12 are mated with sockets 21C and 21D, for example, of the alignment plate and the other end of the plate 21 is positioned under module 11. The alignment plate coupling modules 11 and 12 together maintain the envelope processing path 15 level and aligned over the modules 11 and 12 employed in the franking machine 10, and also maintain a defined gap between the modules, desirable not to convey vibrations from one to the other.

Other new and improved features of the present modular franking system 10 include [1] at least one module 11, having a module photocell beam sensor 25 to detect the arrival of an envelope, and memory storing the distance from the sensor to each end or both ends of the module and [2] a machine microprocessor system including a communication bus node controller integrated or discrete part of the processor system. The memory stores system information about each actor and sensor including the distance between the photocell 25 and the ends of module.

The communication bus 30 of franking machine 10 is coupled to the machine microprocessor system, which is coupled to sensor 25 and other sensors and actors that detect articles (envelopes) and act on them. The microprocessor system processes information from the sensors and actors together with memory stored information and communicates information along the system bus.

In one embodiment, the franking machine communication system is a CAN™ serial communication bus that connects via an integrated or discrete CAN controller to each microprocessor system in machine 10. In alternate embodiments, any other suitable communications technique can be used between the modules. Information such as the distance between the photocell 25 and one or both ends of module 11 and/or 12 is stored in a chip memory, and passed on to the system bus upon startup so it can be used to control the flow of an envelope through modules.

The information about the distance from an envelope sensor to an upstream edge of a module and the distance from an envelope sensor to a downstream edge of the same module is stored in a memory in each module but is broadcasted downstream to other modules and the host processor.

In one configuration of the franking system, the franking module, module 12, which typically contains the printhead and postage information, can also contain the system controller. If a jam occurs in the feeder module, it is broadcast to the system. The franking module 12 may have to still process envelopes downstream in the system and the system controller decides when the downstream envelopes are finished and the downstream transport can be shut down so that the jam can be cleared. Once the system is shut down, the operator is issued a request that the jam be cleared. Once this done, the operator confirms this through the control panel and the controller starts the system again.

In this system each module or peripheral can send to downstream modules a message to announce the next envelope is coming. Because the downstream module is aware of the distance between the upstream sensor and its edge and the downstream module is aware of the distance between the downstream module sensor and its edge, the downstream module knows the window of time to expect the next envelope. For instance, if the downstream module can expect the next envelope to arrive at its sensor within a window of 95 to 105 milliseconds and the downstream module does not sense the envelope during this time frame or period, the downstream module will identify and broadcast the problem. On the other hand, if the downstream module senses an envelope and there was no announcement from the upstream module that it is coming, the downstream module will again broadcast that there is a problem. Once broadcast, such feeding errors, detected by timing, force the system controller to take appropriate action.

The following sequence is an example of initiating a run of envelopes and detecting an error. The operator powers up the system. The host controller in module 12 determines which modules and peripherals are available and informs each module who its upstream neighbor is. Each module provides the distance between its sensor and its edge in the letter flow direction to the host controller. Each module can do this since each has this information about itself. The host controller determines which module is immediately downstream of each other module and informs the downstream module(s) which module is immediately upstream of it and the distance from the upstream module sensor to its edge. When the downstream module obtains the upstream module's distance the downstream module puts it together with its own distance from its sensor to the edge in the direction of the upstream module and enables a calculation to be made for the time or window of time when an envelope should arrive once it is announced by the upstream module. If the envelope does not arrive in that time after an announcement is received that it is on its way, an error is broadcast by the downstream module. It is noted that the host controller can be in a device electronically connected to the system. In one embodiment, the host controller may not be a part of the system, in the module with the franking device, or in any other of the modules. In feeding an envelope through the system, the present invention can also provide complete end-to-end control of the envelopes as they pass by the sensors in each module.

In one embodiment, the franking system can be configured to operate at a speed, such as, for example, 13000 envelopes per hour, for mixed mail up to a predetermined thickness or size or weight of envelope. If any of these parameters is exceeded, sensors built into the system can detect this situation and automatically stop the system. The operator can take out the envelope(s) beyond the predetermined parameters and have postage applied manually such as by placing the postage on a tape and attaching the tape to the envelope.

Other configurations are also possible. For instance, if the system is operated at a predetermined speed in a particular run of envelopes up to a predetermined weight and/or size envelope, the system can also accommodate larger and heavier envelopes. This can result in a slower speed within a run of envelopes that would have a normally higher speed of operation. The sizes of envelopes can be detected, for instance, by sensing the leading and trailing edges in the first module. The weight can be detected by a dynamic weighing platform module in the system. When an envelope exceeds a predetermined weight for the configured speed of the system, postage can be withheld from being applied to that envelope. However, the envelope can continue to be fed through and out of the system and the system stopped at that point. As soon as the overweight envelope without postage exits the system is stopped, the envelope on the top of the output tray will be the one without postage. The operator can remove the envelope from the tray and can put it in the top of the stack of envelopes to be fed through the system in the input tray. The system is then restarted and the rest of the envelopes are fed through the system in the ordinary fashion but at a slower speed more consistent with the envelope just placed on the input stack. The remainder of the stack of envelopes is then completely fed through the system at the lower speed. This technique can be used to avoid having the franking system have to change speeds in the middle of a run.

Figure 7:
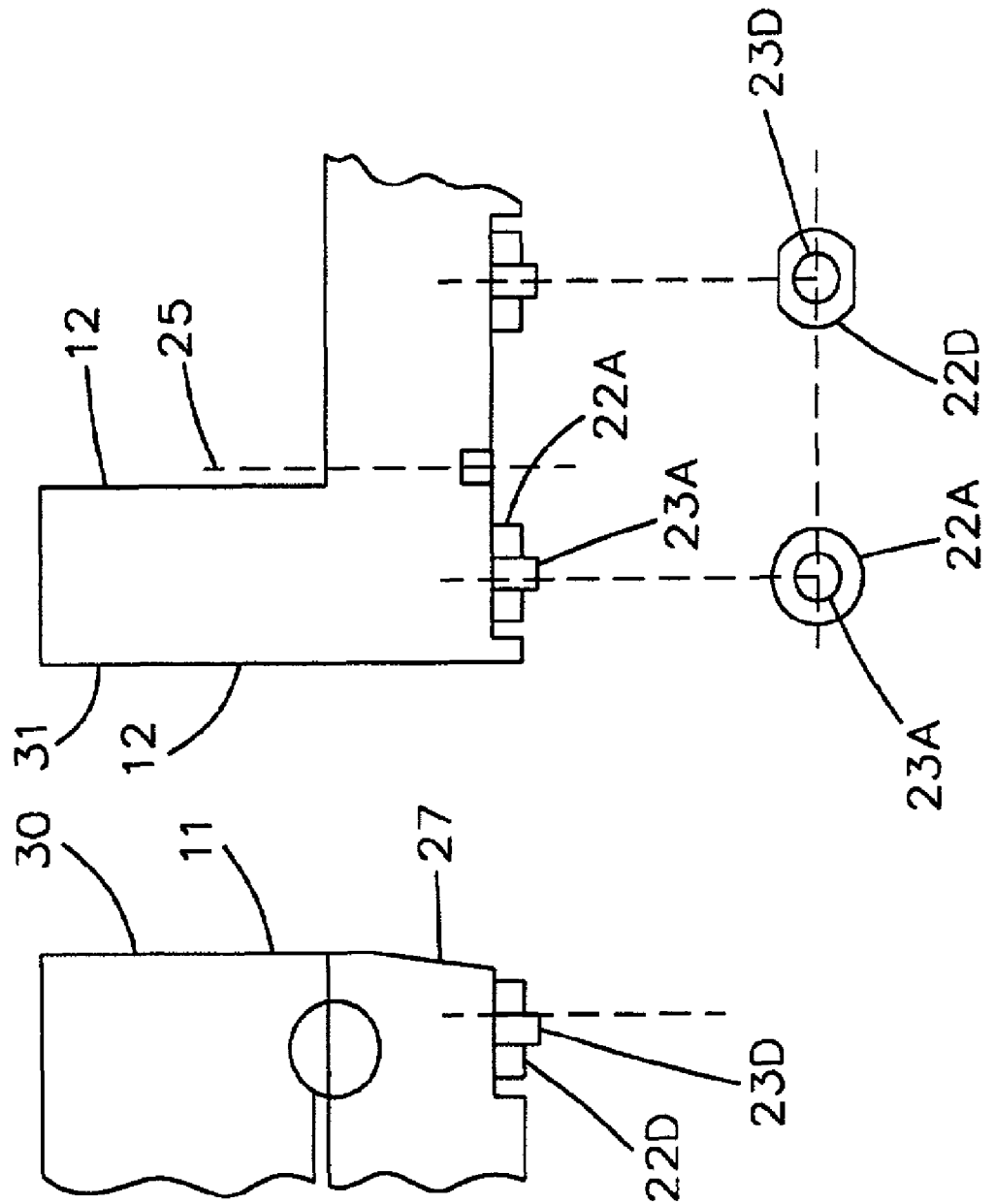
FIG. 7 is a schematic, partial view of the left, or upstream module (11) in front elevation view, and the right or downstream face of the end walls of module 12 that abut when the two modules 11 and 12 are coupled together by an alignment plate 21 having sockets 21a-d for mating with feet 23a-d thereby locking modules together.

Turning to FIG. 7, modules 11 and 12 have vertical flat surfaces 30 and 31 that fit with a defined gap when the downstream feet 23A and 23B of module 11 and the upstream feet 23C and 23D of module 12 are locked to sockets 21A-21D of the alignment plate 21. A draft angle surface 27 or gap is formed on the downstream end of module 11 when the vertical surfaces 50 and 51 of modules 11 and 12 are coupled. A resultant triangular gap is created that can be used to separate modules 11 and 12. Returning to the CANopen data communication bus, the broadcast data bus employs a communication bus wire 60 that is coupled to the host processor chip in the PowerPost™ module 12. Each actor and sensor within the interior of each module of the franking machine 10 is connected to its modules microprocessor or controller system by internal wired or bus lines. The CANbus controller in each module is connected by a bus wire to terminate outside a module. One end of a outside bus system segment couples to an end of an upstream inside bus segment and the second end of an outside bus system segment couples to an end of a downstream bus segment. Thus, a continuous bus connection extends via the upstream inside bus segments through an outside bus segment to an inside downstream bus segment.

A single, outside CANbus segment 100 can be coupled to by male connectors 101 and 102 at each end of segment 100 thereby continuing the CANbus from module 11 through module 12. This segmentation permits an operator to rapidly remove an outside CANbus segment between two modules 11 and 12 to add or replace an adjacent module.

Figure 6:
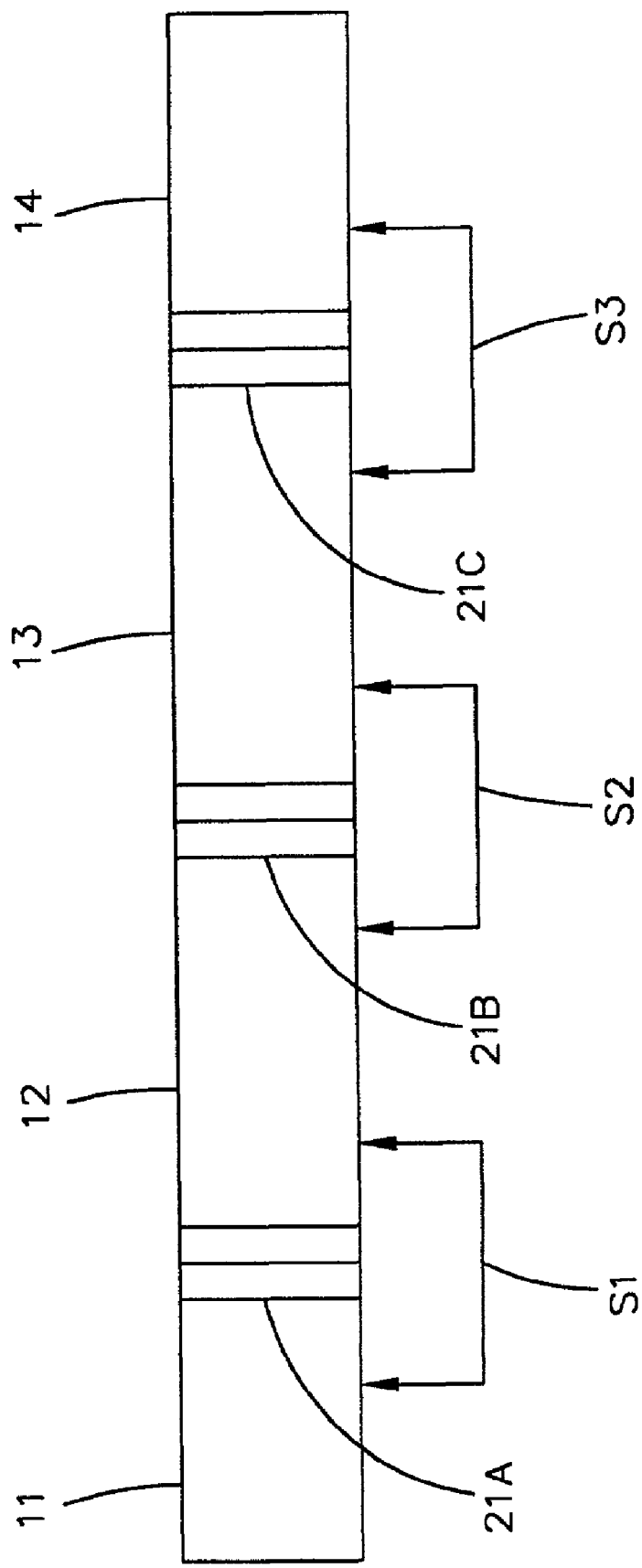
FIG. 6 is a schematic representation of a franking machine 10 comprising four envelope or mailpiece processing modules 11-14 mechanically coupled to one another by alignment plates 21a-21c and outside bus segments S1-S3 of a machine 10 communication bus that provide continuity of the system bus through the four modules.

A more complex use of the moveable outside bus segments 100 is shown in FIG. 6. The envelope processing machine of FIG. 6 employs three outside CANbus segments to complete a continuous CANbus through all four modules 11-14. Each module of FIG. 6 can be mechanically coupled to a neighbor module by an alignment plate 21 and is electrically coupled to a neighbor module by an outside CANbus segment. Removing module 12 from the four module system requires the removal of the downstream CANbus segment S1 from module 12 and the removal of the upstream bus segment end of S2 from module 12. Alignment plate 21a binding modules 11 and 12 together is removed and the alignment plate 21b binding modules 12 and 13 together is removed thereby allowing the removal of module 12 from the four module system. Next, module 11 is bound to module 13 by binding plate 21a and the outside CANbus segment S1 is coupled between module 11 and module 13 creating a new three-module article processing system.

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A modular franking machine for processing empty or filled envelopes into fully or partially finished mailpieces, the machine comprising:

at least a first module and a second module;

a first envelope actor within the first module for moving the envelopes along an envelope processing path through the first module;

a second envelope actor within the second module for moving the envelopes along the envelope processing path through the second module;

a first envelope sensor within the first module for sensing the location of at least one of the envelopes within the first module;

a second envelope sensor within the second module for sensing the location of at least one of the envelopes within the second module;

module memory within each module for storing the respective distance between the respective sensor within each module and at least one of the respective upstream and respective downstream ends of each module, the respective distances used by the modular franking machine to determine the respective locations of the respective sensors within the entire modular franking machine; and a computer including a host processor and a host memory, for calculating and printing postage for each envelope fed through the machine and coupled to a system bus by a bus node controller;

wherein the second module is coupled downstream from the first module within the envelope processing path, and the second module includes a processor system with a processor system memory for storing a table of data about modules including combinations of different modules; and wherein the host memory includes information pertaining to each module within the machine to identify additions and removals of modules from the modular franking machine.

2. The modular franking machine of claim 1 wherein, based on the modules present in the machine at startup, each module is assigned its respective immediately upstream and immediately downstream modules to enable each module to monitor and react on respective broadcasts of these respective modules.

3. The modular franking machine of claim 2 wherein the respective broadcasts are signals, telegrams, messages or status information.

4. The modular franking machine of claim 1 wherein each module is capable of broadcasting information, about a letter flowing through the modular franking machine, on a multi-master field bus.

5. The modular franking machine of claim 4 where the information, about the letter flowing through the modular franking machine, is position, velocity, length, weight or identifier data.

6. The modular franking machine of claim 1 wherein any or each module is capable of sending information, about a letter flowing through the modular franking machine, on a point to point communication bus, with point to point addressing being dynamically set up at startup based on an assignment of a respective set of immediately upstream and immediately downstream modules to each respective module.

7. The modular franking machine of claim 6 wherein the information, about the letter flowing through the modular franking machine, is position, velocity, length, weight or identifier data.

* * * * *